US006368707B1

(12) United States Patent
Kamiya et al.

(10) Patent No.: US 6,368,707 B1
(45) Date of Patent: Apr. 9, 2002

(54) HEAT-SENSITIVE ADHESIVE SHEET

(75) Inventors: Daisuke Kamiya; Keiji Maeda; Hiroyuki Ota, all of Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 09/214,518

(22) PCT Filed: Jul. 18, 1997

(86) PCT No.: PCT/JP97/02594

§ 371 Date: Jan. 7, 1999

§ 102(e) Date: Jan. 7, 1999

(87) PCT Pub. No.: WO98/03602

PCT Pub. Date: Jan. 29, 1998

(30) Foreign Application Priority Data

Jul. 19, 1996 (JP) .............................. 8-207563
Jul. 31, 1996 (JP) .............................. 8-217885

(51) Int. Cl.$^7$ ................................. B32B 7/12
(52) U.S. Cl. ............................. 428/349; 428/355 AC; 525/190
(58) Field of Search ................... 428/349, 355 AC; 525/190

(56) References Cited

U.S. PATENT DOCUMENTS 5,385,967 A * 1/1995 Bauer et al. ................ 524/458

FOREIGN PATENT DOCUMENTS

| EP | 0 574 803 A2 | 6/1993 | |
| EP | 0 623 659 A2 | 4/1994 | |
| JP | 57-12084 | 1/1982 | ............... C09J/7/02 |
| JP | 5-271645 | 10/1993 | .......... C09J/201/00 |
| JP | 6-179856 | 6/1994 | .......... C09J/119/00 |
| JP | 8-269420 | 10/1996 | .......... C09J/133/06 |
| JP | 8-269431 | 10/1996 | .......... C09J/201/08 |

* cited by examiner

Primary Examiner—James J. Seidleck
Assistant Examiner—Melanie D. Bagwell
(74) Attorney, Agent, or Firm—Sughrue Mion, PLLC

(57) ABSTRACT

A heat-sensitive adhesive sheet comprising a substrate having formed thereon an adhesive layer comprising a polymer composition (C) which comprises the following aqueous emulsion (A) and copolymer (B), wherein an adhesive force determined by the 180° peeling test method as specified in JIS Z 0237 at a temperature of 25° C. is 10 g/25 mm or less: Aqueous emulsion (A): An aqueous emulsion containing an alkyl (meth)acrylate-based polymer (a) having a glass transition temperature of −10° C. or below, which is obtained by emulsion-polymerizing radically polymerizable monomers containing as the main component an alkyl (meth)acrylate; and Copolymer (B): A water-soluble or water-dispersible copolymer (B) having a glass transition temperature of 20° C. or above, which is a copolymer obtained by copolymerizing an α,β-ethylenically unsaturated carboxylic acid with other radically polymerizable monomers, wherein a part or the entire amount of carboxyl groups in the copolymer is neutralized with a base having a boiling point of 110° C. or below.

8 Claims, No Drawings

HEAT-SENSITIVE ADHESIVE SHEET

TECHNICAL FIELD

This invention relates to an adhesive sheet. More particularly, it relates to a heat-sensitive adhesive sheet which has non-adhesive properties or has very low adhesive properties at ordinary temperature, but exhibits adhesive properties upon heating and also exhibits adhesive properties by applying pressure.

BACKGROUND ART

In general, adhesive sheets with release papers (mold-release papers) covered on the adhesive surface thereof are subjected to storage, distribution, marketing, etc. Further, wind-up type products such as adhesive tapes use substrates having a back surface having been subjected to a release treatment, so as to be capable of re-winding the tape when using the same. Since release papers become unnecessary after adhering adhesive tapes onto adherends, release paper-free adhesive sheets are demanded from the reasons of resource saving and cost reduction. Furthermore, if substrates, the back surface of which being not subjected to release treatment, can be used in adhesive tapes, it is possible to simplify the production steps of the adhesive tape substrates and also decrease the production cost.

Known examples of release paper-free adhesive sheets include heat-sensitive adhesive sheets coated with delayed-tack type adhesives (JP-B-62-21835 and JP-A-6-10084; the term "JP-A" as used herein means an "unexamined published Japanese patent application", and the term "JP-B" as used herein means an "examined Japanese patent publication"). Those publications disclose delayed-tack type adhesives comprising thermoplastic resins such as ethylene/vinyl acetate copolymers having mixed therewith solid plasticizers such as dicyclohexyl phthalate. Those publications also describe that the adhesives have non-adhesive properties at ordinary temperature but exhibit adhesive force due to that the plasticizers melt by heating.

However, these conventional delayed-tack type adhesives containing solid plasticizers have various problems as mentioned in (i) to (iv) below, and are applicable only to limited and specific purposes of use at the present stage.

(i) After crystallization of a solid plasticizer proceeds, adhesive force is lost. Therefore, once an adhesive sheet is peeled off from an adherend, such an adhesive tape cannot again be adhered thereto.

(ii) The heating temperature for exhibiting adhesive properties depends on the melting point of a solid plasticizer, which makes it impossible to arbitrarily set the heating temperature.

(iii) After the crystallization proceeds, the adhesive becomes hard, and loses its flexibility. Therefore, if the adhesive tape is adhered to an adherend, and then the adherend is bent or vibration is applied to the adherend, there is a fear that the adhesive layer cannot follow the adherend and, as a result, peels off therefrom.

(iv) Where the substrate used in the adhesive sheet is made of woodfree paper, etc., the plasticizer tends to ooze out onto the sheet surface when the adhesive sheet is heated.

Therefore, an object of the present invention is to provide a heat-sensitive adhesive sheet which has non-adhesive properties or has very low adhesive properties at ordinary temperature and, therefore, can be handled as marketed products as such even if release treatment to the adhesive layer (for example, a release paper or release treatment of the back surface of a substrate) is not always conducted, and on the other hand, can exhibit adhesive properties when heating or when applying pressure, thereby being effectively used as adhesive sheets or adhesive tapes.

Another object of the present invention is to provide a heat-sensitive adhesive sheet having excellent qualities and free from the above-mentioned problems (i) to (iv) in the conventional delayed-tack type adhesives.

DISCLOSURE OF THE INVENTION

The present inventors have conducted extensive studies to solve the above-mentioned problems. As a result, they have found that if a heat-sensitive adhesive sheet is formed by mixing an aqueous emulsion containing a specific alkyl (meth)acrylate-based polymer with a copolymer having carboxyl groups neutralized with a specific base to obtain a polymer composition and forming an adhesive layer comprising this polymer composition on a substrate, such an adhesive does not show adhesive properties at all or does not substantially show adhesive properties at ordinary temperature but exhibits adhesive properties when heating or when applying pressure, and thus can effectively be used as an adhesive sheet.

Further, the present inventors have found that in the adhesive sheet thus obtained, the adhesive properties once exhibited are not lost and good adhering state is maintained even if the adhesive sheet is adhered on a substrate and time passes; the adhesive layer does not become hard even after the passage of time; and components in the adhesive layer do not ooze out onto the substrate even by heating. The present invention has been completed based on those findings.

Accordingly, the present invention provides a heat-sensitive adhesive sheet or a heat-sensitive adhesive tape, comprising a substrate having formed thereon an adhesive layer comprising a polymer composition (C) which comprises the following aqueous emulsion (A) and copolymer (B), wherein an adhesive force determined by the 180° peeling test method as specified in JIS Z 0237 at a temperature of 25° C. is 10 g/25 mm or less:

Aqueous emulsion (A): An aqueous emulsion containing an alkyl (meth)acrylate-based polymer (a) having a glass transition temperature of $-10°$ C. or below, which is obtained by emulsion-polymerizing radically polymerizable monomers containing as the main component an alkyl (meth)acrylate; and Copolymer (B): A water-soluble or water-dispersible copolymer (B) having a glass transition temperature of 20° C. or above, which is a copolymer obtained by copolymerizing an $\alpha,\beta$-ethylenically unsaturated carboxylic acid with other radically polymerizable monomers, wherein a part or the entire amount of carboxyl groups in the copolymer is neutralized with a base having a boiling point of 110° C. or below.

Further, the present invention is a heat-sensitive adhesive sheet, characterized in that it is a heat-sensitive adhesive sheet having on a substrate an adhesive layer comprising a polymer composition emulsion (C) obtained by emulsion polymerizing a radically polymerizable monomer comprising as a main component, an alkyl (meth)acrylate forming an alkyl (meth)acrylate-based polymer (a) having a glass transition temperature of $-10°$ C. or less, in an aqueous medium in the presence of a water-soluble or water-dispersible copolymer (B) having a glass transition temperature of 20° C. or more, which is a copolymer having an acid value of 30–260 mgKOH/g obtained by copolymerizing an $\alpha,\beta$-ethylenically unsaturated carboxylic acid with other radically polymerizable monomers, wherein a part or the entire amount of carboxyl groups in the copolymer is neutralized with a base having a boiling point of 110° C. or less; and that an adhesive force determined by the 180° peeling test method as specified in JIS Z 0237 at a temperature of 25° C. is 10 g/25 mm or less The heat-sensitive adhesive sheet of the present invention as described above can be used without subjecting any release treatment to the adhesive layer (that is, without using a release paper or without subjecting release treatment to the back surface of the substrate). Further, the sheet can also be used in the state that the release treatment has been applied, if desired.

BEST MODE FOR CARRYING OUT THE INVENTION

The present invention will be described in detail below.

The term "heat-sensitive adhesive sheet" as used herein means one having an adhesive layer comprising a polymer composition which comprises the above-mentioned aqueous emulsion (A) and copolymer (B), formed on a substrate. The substrate in such a heat-sensitive adhesive sheet is not particularly limited in shape, size, form, material, etc., and any one may be used. Accordingly, the "heat-sensitive adhesive sheet" of the present invention means all of heat-sensitive adhesive sheets having substrates in the form of a sheet, heat-sensitive adhesive tapes having substrates in the form of a tape, those having substrates in the form of a plate and those having substrates in the form of shapes or forms other than the above-mentioned types.

Further, the heat-sensitive adhesive sheet of the present invention may be one having an adhesive layer on one surface of the substrate, one having an adhesive layer on both surfaces of a substrate, or one having an adhesive layer on portions other than front surface/back surface of a substrate when the substrate has a thickness to a certain extent.

The aqueous emulsion (A) used in the adhesive layer of the heat-sensitive adhesive sheet of the present invention is an aqueous emulsion comprising an alkyl (meth)acrylate-based polymer having a glass transition temperature (hereinafter simply referred to as "Tg") of −10° C. or below, which is obtained by emulsion-polymerizing radically polymerizable monomers comprising as the main component an alkyl (meth)acrylate. More preferable Tg of the alkyl (meth)acrylate-based polymer contained in the aqueous emulsion (A) is −30° C. or below. If the Tg of the alkyl (meth)acrylate-based polymer exceeds −10° C., sufficient adhesive force does not exhibit even when heating or applying pressure, and the desired heat-sensitive adhesive sheet is not obtained.

An alkyl (meth)acrylate-based polymer having Tg of −10° C. or below will hereinafter be referred to as an "alkyl (meth)acrylate-based polymer (a)".

Tg of the polymer in the present invention is calculated from the following calculation formula (1):

$$1/Tg = \Delta W(a)/Tg(a) + \Delta W(b)/Tg(b) + \Delta W(c)/Tg(c) \tag{1}$$

In the above formula:

Tg=Tg of the polymer;

W(a)=weight ratio of structural unit comprising monomer (a) in the polymer;

W(b)=weight ratio of structural unit comprising monomer (b) in the polymer;

W(c)=weight ratio of structural unit comprising monomer (c) in the polymer;

Tg(a)=glass transition temperature of homopolymer of the monomer (a);

Tg(b)=glass transition temperature of homopolymer of the monomer (b); and

Tg(c)=glass transition temperature of homopolymer of the monomer (c).

The aqueous emulsion (A) preferably used is one obtained by emulsion-polymerizing an alkyl (meth)acrylate used as the main component (preferably 60 to 100% by weight) optionally with a small amount (preferably 40% by weight or less) of other radically polymerizable monomers copolymerizable with the alkyl (meth)acrylate (hereinafter sometimes simply referred to as "copolymerizable monomers") in an aqueous medium, as will be described hereinafter.

The alkyl (meth)acrylate used in the production of the aqueous emulsion (A) is preferably an alkyl (meth)acrylate having an alkyl group of 1 to 9 carbon atoms, and examples thereof include methyl (meth)acrylate, ethyl (meth)acrylate, isopropyl (meth)acrylate, n-propyl (meth)acrylate, n-butyl (meth)acrylate, isobutyl (meth)acrylate, hexyl (meth) acrylate, cyclohexyl (meth)acrylate, 2-ethylhexyl (meth) acrylate, n-octyl (meth)acrylate, isooctyl (meth)acrylate, n-nonyl (meth)acrylate and isononyl (meth)acrylate. One kind or two kinds or more of those alkyl (meth)acrylates can be used. Further preferably alkyl (meth)acrylate used in the production of the aqueous emulsion (A) is an alkyl (meth) acrylate having analkyl group of 4 to 9 carbon atoms.

Examples of the copolymerizable monomer include aromatic vinyl monomers such as styrene, α-methylstyrene and vinyltoluene; unsaturated carboxylic acids such as (meth) acrylic acid, crotonic acid, cinnamic acid, itaconic acid, fumaric acid and maleic acid; monoalkyl esters of unsaturated dicarboxylic acids such as monoethyl itaconate, monobutyl fumarate and monobutyl maleate; hydroxylated vinyl monomers such as 2-hydroxyethyl (meth)acrylate, 2-hydroxypropyl (meth)acrylate, polyethylene glycol (meth) acrylate and polypropylene glycol (meth)acrylate; (meth) acrylonitrile, vinyl acetate, (meth)acrylamide, N-methylolacrylamide, glycidyl methacrylate, vinyl acetate, vinyl chloride and vinylidene chloride. One kind or two kinds or more of those copolymerizable monomers can be used.

Where the above-described copolymerizable monomer is employed, it is preferable that the amount of the copolymerizable monomer used is 40% by weight or less as described above based on the total weight of the radically polymerizable monomers used for the production of the aqueous emulsion (A). If the amount of the copolymerizable monomer used exceeds 40% by weight, adhesive properties of the alkyl (meth)acrylate-based polymer obtained tend to be insufficient. As a result, even if a heat-sensitive adhesive sheet having an adhesive layer containing such an aqueous emulsion (A) is heated, it becomes difficult to exhibit adhesive properties.

The production method of the aqueous emulsion (A) is not particularly limited, and can be conducted in the same manner as in the conventional emulsion-polymerization. That is, the aqueous emulsion (A) can be obtained by uniformly dispersing the above-mentioned alkyl (meth) acrylate optionally together with the above-mentioned copolymerizable monomer in an aqueous medium using a conventional protective colloid or a surfactant as an emulsifier and then conducting emulsion polymerization using a polymerization initiator.

Examples of the polymerization initiator include persulfate type polymerization initiators such as potassium persulfate and ammonium persulfate; azo type polymerization initiators such as 2,2'-azobisisobutyronitrile and 2,2'-azobis (2-methylbutyronitrile); organic peroxides such as benzoyl peroxide and lauroyl peroxide; and redox type polymerization initiators comprising a combination of an oxidizing agent comprising organic perhydroxides (cumene hydroperoxide, tert-butyl hydroperoxide, diisopropylbenzene hydroperoxide, etc.) and a reducing agent (Rongalite, sodium hydrogensulfite, ascorbic acid, etc.). Preferable amount of such a polymerization initiator used is 0.1 to 5% by weight based on the total weight of the monomers.

Examples of surfactants usable as the emulsifier include anionic surfactants such as sodium higher alcohol sulfates, sodium alkylbenzenesulfonates, sodium dialkyl succinate sulfonates and sodium alkyl diphenyl ether disulfonates; and nonionic surfactants such as polyoxyethylene alkyl allyl ethers and polyoxyethyelne/polyoxypropylene block copolymers. Further, reactive anionic surfactants such as sodium allylalkylsulfonates, alkylallylsulfosuccinates and polyoxyethylene alkylallylglycerol ether sulfates may be used.

The present invention can also use the copolymer (B) as will be described hereinafter as a polymeric emulsifier. That is, the polymer composition (C) comprising the aqueous emulsion (A) and the copolymer (B) can also be obtained by emulsion polymerizing radically polymerizable monomers containing as the main component an alkyl (meth)acrylate capable of providing the above-mentioned alkyl (meth)acryalte-based polymer (a) in an aqueous medium in the presence of the copolymer (B). According to this production method, since the polymer composition (C) can be obtained even if a low molecular weight surfactant is not used or the amount of the surfactant is decreased to a small amount, an adhesive having excellent water resistance tends to be easily obtained.

In the emulsion polymerization for the production of the aqueous emulsion (A), a chain transfer agent may be used to control the molecular weight of the alkyl (meth)acrylate-based polymer product. Examples of the chain transfer agent include mercaptoacetic acid, mercaptopropionic acid, 2-propanethiol, 1-butanethiol, 2-methyl-2-propanethiol, 2-mercaptoethanol, ethyl mercaptoacetate, thiophenol, 2-naphthalenethiol, dodecyl mercaptan and thioglycerol.

The polymerization temperature in producing the aqueous emulsion (A) is preferably about 0 to 150° C., and more preferably 20 to 90° C. The polymerization in such a case is preferably 1 to 24 hours, and more preferably 3 to 8 hours.

The content (solid content) of the alkyl (meth)acrylate-based polymer (a) in the aqueous emulsion (A) obtained is preferably 5 to 80% by weight, and more preferably 30 to 70% by weight, from the point of ease of handling properties.

The copolymer (B) used together with the above-mentioned aqueous emulsion (A) in the adhesive layer of the heat-sensitive adhesive sheet of the present invention is a water-soluble or water-dispersible copolymer having Tg of 20° C. or above, which is obtained by copolymerizing an α,β-ethylenically unsaturated carboxylic acid with other radically polymerizable monomers (hereinafter sometimes referred to as "copolymerizable monomers"), wherein a part or the entire amount of the carboxyl groups in the copolymer obtained above (hereinafter referred to as a "copolymer before neutralization") is neutralized with a base having a boiling point of 110° C. or below.

If Tg of the copolymer (B) is lower than 20° C., the adhesive layer comprising the polymer composition (C) obtained by mixing the copolymer (B) with the above-mentioned aqueous emulsion (A) fails to show non-adhesive properties or low adhesive properties at room temperature. That is, the adhesive force at 25° C. determined by the 180° peeling test as specified in JIS Z 0237 exceeds 10 g/25 mm and, as a result, the object of the present invention cannot be achieved. Further, if Tg of the copolymer (B) is extremely high, heating temperature for exhibiting the adhesive properties becomes high. As a result, the workability and heat efficiency during adhering operation of the sheet decrease. In addition, the substrate of the heat-sensitive adhesive sheet tends to modify due to high temperature when heating. Therefore, considering those points, preferable Tg of the copolymer (B) is 30 to 200° C., and more preferable Tg is 70 to 150° C.

Examples of the α,β-ethylenically unsaturated carboxylic acid used for producing the copolymer before neutralization include acrylic acid, methacrylic acid, crotonic acid, maleic acid, fumaric acid, itaconic acid, citraconic acid and maleic anhydride. Preferred is acrylic acid and/or methacrylic acid therefor. Preferable amount of the α,β-ethylenic unsaturated carboxylic acid used is such an amount that an acid value of the copolymer prior to the neutralization with the base (i.e., the copolymer before neutralization), obtained by copolymerizing the α,β-ethylenically unsaturated carboxylic acid with other radically polymerizable monomers is 30 to 260 mgKOH per 1 g of the copolymer before neutralization. If the acid value of the copolymer before neutralization is less than 30 mgKOH per 1 g of the copolymer before neutralization, it is difficult to obtain a copolymer which can well dissolve or disperse in water even if neutralizing the same with a base. On the other hand, if the acid value thereof exceeds 260 mgKOH/g, the copolymer obtained has poor water resistance.

The amount of the α,β-ethylenically unsaturated carboxylic acid used to give the acid value as specified above varies depending on the type of the unsaturated carboxylic acid used. However, the α,β-ethylenically unsaturated carboxylic acid is generally used in an amount of 3 to 40% by weight based on the total weight of the monomers used in the production of the copolymer before neutralization. Examples of the other copolymerizable monomer used together with the above-mentioned α,β-ethylenically unsaturated carboxylic acid for producing the copolymer (B) (i.e., the copolymer before neutralization) include (meth) acrylates such as methyl (meth)acrylate, ethyl (meth) acrylate, propyl (meth)acrylate, butyl (meth)acrylate, isobutyl (meth)acrylate, tert-butyl (meth)acrylate, pentyl (meth) acrylate, hexyl (meth)acrylate, octyl (meth)acrylate, 2-ethylhexyl (meth) acrylate, cyclohexyl (meth) acrylate, 2-hydroxyethyl (meth) acrylate, 2-hydroxybutyl (meth) acrylate, polyalkyleneglycol (meth)acrylate, glycidyl (meth) acrylate, dimethylaminoethyl (meth)acrylate and perfluoroalkyl (meth)acrylate; aromatic vinyl compounds such as styrene, vinyltoluene and α-methylstyrene; (meth) acrylonitrile, vinyl acetate, vinyl propionate, N-methylol (meth)acrylamide, vinyl chloride, vinyl fluoride, vinylidene chloride, vinylidene fluoride, ethylene and trichloroethylene. One kind or two kinds or more of these monomers can be used. Of those, alkyl (meth)acrylates having alkyl groups of 1 to 4 carbon atoms are preferably used.

The type and the use proportion of the α,β-ethylenically unsaturated carboxylic acid and other copolymerizable monomers are selected based on the above-mentioned calculation formula (1) such that Tg of the polymer obtained is 20° C. or above.

As a polymerization method to obtain the above-mentioned copolymer before neutralization, conventional polymerization methods such as a method of using a radical polymerization initiator or a method by irradiation with radiation can be used. A method of using a radical polymerization initiator is preferable from the points of ease of polymerization operation and ease of molecular weight control of the alkyl (meth)acrylate-based polymer obtained. Further, the polymerization method includes solution polymerization method, suspension polymerization method, emulsion polymerization method, bulk polymerization method and precipitation polymerization method. Of those, a solution polymerization method wherein the polymerization reaction is conducted in an organic solvent is preferably employed.

Examples of the organic solvent preferably used in the above-described solution polymerization include ketone solvents such as acetone, methyl ethyl ketone and methyl isobutyl ketone; acetate solvents such as ethyl acetate and butyl acetate; aromatic hydrocarbon solvents such as benzene, toluene and xylene; aliphatic hydrocarbon solvents such as cyclohexane, hexane and heptane; and alcoholic solvents such as methanol, ethanol, isopropanol, methyl cellosolve, ethyl cellosolve, n-butyl cellosolve, ethylene glycol, propylene glycol, trimethylolpropane and glycerol. Those organic solvents may be used alone or as a mixture of two or more thereof. Of those, methyl ethyl ketone and/or isopropyl alcohol are more preferably used as the organic solvent.

As the radical polymerization initiator used in the solution polymerization, any one generally used in radical polymerization can be used. For example, the same organic peroxides, inorganic peroxides or azo compounds as those exemplified above as the polymerization initiator for obtaining the aqueous emulsion (A) can be used.

In the above-mentioned solution polymerization, a chain transfer agent may be added to the polymerization system in order to control the molecular weight of the copolymer before neutralization. As the chain transfer agent in such a case, chain transfer agents having a mercapto group similar to the chain transfer agent described above regarding the production of the aqueous emulsion (A) are preferably used.

The polymerization temperature for obtaining the copolymer before neutralization is preferably about 10 to 150° C., and more preferably 60 to 100° C. Further, the polymerization time is preferably 1 to 100 hours, and more preferably 3 to 10 hours.

It is preferable that the copolymer before neutralization has a number average molecular weight of 1,000 to 500,000. If the number average molecular weight of the copolymer before neutralization is less than 1,000, water resistance or moisture resistance of the adhesive layer in the heat-sensitive adhesive sheet tends to be poor. On the other hand, if it exceeds 500,000, it becomes difficult to produce the copolymer before neutralization per se due to the high viscosity.

A part of or the entire carboxyl groups in the copolymer before neutralization obtained by the above polymerization is then neutralized with a base having a boiling point of 110° C. or below to convert to the copolymer (B) used in the present invention.

If the boiling point of the base used for the neutralization exceeds 110° C., the adhesive layer of the obtained heat-sensitive adhesive sheet has poor water resistance.

Specific examples of the base having a boiling point of 110° C. or below used in the neutralization of the carboxyl groups in the copolymer before neutralization include ammonia, methylamine, ethylamine, propylamine, isopropylamine, butylamine, amylamine, dimethylamine, diethylamine, dipropylamine, diisopropylamine, trimethylamine, triethylamine and allylamine. Of those, ammonia is preferably used.

The neutralization amount of carboxyl groups in the copolymer before neutralization is preferably 30 mol % or more, and more preferably 50 mol % or more, of the carboxyl groups. If the neutralization amount of the carboxyl groups in the copolymer before neutralization is less then 30 mol %, surface activity, water solubility, water dispersibility, etc., of the copolymer (B) decrease, so that when the aqueous emulsion (A) and the copolymer (B) are mixed, it becomes difficult for the copolymer (B) to uniformly dissolve or disperse in the aqueous emulsion (A). As a result, the adhesive layer formed from such a mixture tend to have poor physical properties (for example, development property of adhesive force when heating, adhesive force, or the like).

To neutralize the carboxyl groups in the copolymer before neutralization, it is preferable that the copolymer before neutralization obtained by, for example, the above-mentioned solution polymerization is not taken up from the reaction medium but allowed to remain therein as such (in particular, in a state being dissolved in an organic solvent) and then a base for neutralization is added thereto, since this procedure can be easily performed. It is still preferable to add the base for neutralization in the form of an aqueous solution, since the carboxyl groups can be smoothly neutralized thereby.

That is to say, it is preferable to employ a process which comprises producing the copolymer before neutralization by the solution polymerization; adding a base for neutralization thereto to thereby neutralize the carboxyl groups in the copolymer before neutralization, thus forming a copolymer (B) in the reaction medium; removing the organic solvent existing in the reaction system by an appropriate procedure (for example, under reduced pressure) to obtain an aqueous solution or an aqueous dispersion of the copolymer (B); then mixing the aqueous solution or aqueous dispersion as such with an aqueous emulsion (A) to obtain an aqueous polymer composition; and applying the aqueous polymer composition to a substrate to thereby form an adhesive layer, since this process can be easily carried out and have of only a small number of steps. In this process, it is preferable from the viewpoints of the handling properties and the formation of the adhesive layer to control the content of the copolymer (B) (in terms of solid content) in the aqueous solution or aqueous dispersion thereof to about 10 to 80% by weight before mixing with the aqueous emulsion (A).

Of course, the copolymer (B) can be separated and recovered from the reaction system after completion of the neutralization and then mixed with the aqueous emulsion (A).

As described above, it is also possible in the present invention to emulsion-polymerize in an aqueous medium a radically polymerizable monomer capable of forming an alkyl (meth)acrylate-based polymer (a) in the presence of the copolymer (B). In this case, the aqueous solution or aqueous dispersion of the copolymer (B) obtained by the above-mentioned method is employed as the polymerization medium. It is preferable that the concentration of the copolymer (B) in the aqueous solution or aqueous dispersion thereof to be used as the polymerization medium ranges from 10 to 60% by weight.

In the polymer composition (C) comprising the above-mentioned aqueous emulsion (A) and copolymer (B), the weight ratio of the copolymer (B) (in terms of solid content) to the alkyl (meth)acrylate-based polymer (a) (in terms of solid content) is preferably from 5/95 to 80/20, and more preferably from 10/90 to 60/40. [The polymer composition (C) obtained by mixing the aqueous emulsion (A) with the copolymer (B) will be sometimes referred to as the "adhesive composition".] When the content of the copolymer (B) is less than 5% by weight based on the solid content in the adhesive composition, the emulsion particles of the aqueous emulsion (A) cannot be sufficiently coated with the copolymer (B). Thus, the adhesive layer of the resulting adhesive sheet shows an adhesive strength exceeding 10 g/25 mm at ordinary temperature (25° C.). Such an adhesive sheet is excluded from the scope of the present invention which relates to adhesive sheets requiring no release treatment (i.e., treatment with release paper or release agents). When the content of the copolymer (B) in the adhesive composition exceeds 80% by weight based on the solid content in the adhesive composition, on the other hand, it is frequently observed that the resulting adhesive composition exhibits only poor adhesion performance upon heating or under elevated pressure due to its excessively high Tg.

The above-mentioned adhesive composition to be used in the adhesive layer of the heat-sensitive adhesive sheet of the present invention may further contain, depending on the purpose of use thereof, one or more additives commonly used in adhesives, for example, defoaming agents, surfactants, mildewproofing agents, perfumes, neutralizers, tackifiers, thickeners, leveling controlling agents, antifreezing agents, foaming agents, antioxidants, UV absorbers, reinforcing agents, fillers, pigments, fluorescent brighteners, antistatic agents, antiblocking agents, flame-retardants, crosslinking agents, plasticizers, lubricants, organic solvents and coloring matters.

In the heat-sensitive adhesive sheet of the present invention, the substrate is not particularly limited, an appropriate one can be used depending on the purpose of use of the heat-sensitive adhesive sheet. Examples thereof include films, sheets and plates made of fabrics, papers, leathers, woods, metals, glass and various plastics, and foamed plastic sheets. Examples of the substrates made of the above-mentioned plastics include those of polyester, polyamide, vinyl chloride-based polymers, polyethylene, polypropylene and polyurethane. The substrate may have an arbitrary shape, for example, a continuous one or one cut into a definite size (for example, having been cut into a square, circular or ellipse piece).

The heat-sensitive adhesive sheet of the present invention can be produced by applying an aqueous adhesive composition onto one or both sides of the above-mentioned substrate and then drying the same in an appropriate manner. The adhesive composition may be applied onto the substrate by an arbitrary method without limitation, for example, roll coating, spray coating, casting, doctor blade coating or brush coating. To dry the adhesive composition applied onto the substrate, it is necessary to heat the composition at such a temperature that the adhesive layer in the finally obtained adhesive sheet would not exhibit any adhesive properties at ordinary temperature. The adhesive composition is dried at a temperature not higher than the Tg of the copolymer (B) contained therein. It is more preferable to dry the adhesive composition at a temperature lower by 10 to 20° C. than the Tg of the copolymer (B).

In the heat-sensitive adhesive sheet of the present invention, the thickness of the adhesive layer can be appropriately controlled depending on the purpose of use, etc. Generally, It is preferable that the thickness is about 1 $\mu$m to 1 mm.

The heat-sensitive adhesive sheet of the present invention has an adhesive strength determined by the 180° peeling test method as specified in JIS Z 0237 at a temperature of 25° C. of 10 g/25 mm or less, so that adhesive properties are not shown at ordinary temperature or the adhesive force is very small at ordinary temperature. Accordingly, it can be optionally packed and stored, distributed and sold as such, similar to usual products having no adhesive properties, without subjecting the adhesive layer to any release treatment. Of course, if necessary, release treatment may be applied, for example, where the heat-sensitive adhesive sheet has an adhesive strength of 3 to 10 g/25 mm at 25° C., depending on the purpose use of the adhesive sheet.

In adhering the heat-sensitive adhesive sheet of the present invention to an adherend, the heat-sensitive adhesive sheet can be adhered to an adherend by heating either or both of the adhesive layer of the heat-sensitive adhesive sheet and the adherend. The heating temperature for exhibiting the adhesive properties in the adhesive layer depends on the Tg of the copolymer (B) contained in the adhesive composition. In usual, the heating temperature is a temperature at least 10° C., and preferably at least 30° C., higher than the Tg.

The heat-sensitive adhesive sheet of the present invention once adhered to the adherend is well adhere to the adherend without losing its adhesive properties even after cooling to ordinary temperature, and does not peel off from the adherend spontaneously. When the heat-sensitive adhesive sheet of the present invention is desired to separate from the adherend, it can be easily peeled off therefrom by merely pulling with hand similar to common adhesive sheets. The adhesive layer of the heat-sensitive adhesive sheet thus peeled off still sustains its adhesive properties. Therefore, the heat-sensitive adhesive sheet can be adhered again to the same adherend or another one as such.

Where the adhesive properties are exhibited in the adhesive layer of the heat-sensitive adhesive sheet of the present invention by applying pressure, the heat-sensitive adhesive sheet can be adhered to an adherend by applying a pressing force in the same degree of a writing pressure when writing with a ball-point pen, to the heat-sensitive adhesive sheet.

Even where the adhesive properties are exhibited in the adhesive layer of the heat-sensitive adhesive sheet by applying pressure and the sheet is adhered to an adherend, the adhesive force once exhibited is not lost even after removing the pressure, similar to the case where the adhesive properties are exhibited by heating.

Further, the adhesive properties may be exhibited in the heat-sensitive adhesive sheet of the present invention by heating and applying pressure together.

The adherend to which the heat-sensitive adhesive sheet of the present invention is adhered is not particularly limited in its material or type. For example, the heat-sensitive adhesive sheet of the present invention can be well adhered to fabrics, papers, leathers, woods, metals, glasses, concretes, ceramics, polyester, polypropylenes, polyvinyl chlorides, polyurethanes, polycarbonates, polyamides, polyimides, styrene-based polymers and rubbers.

The present invention is explained specifically by referring to the following Synthesis Examples, Examples and Comparative Examples. Unless otherwise indicated, all "part" and "%" given in these examples are by weight. Further, glass transition temperature (Tg) of polymers, and adhesive force, holding power, probe tack and water resistance of adhesive sheets were measured respectively by the following methods.

(1) Adhesive Force of Adhesive Sheet:

An adhesive composition was applied onto a polyester film having a thickness of 50 $\mu$m at a dry coating thickness of 20 to 30 $\mu$m and then dried at 70° C. for 5 minutes to prepare an adhesive sheet. This sheet was cut into test pieces having a width of 25 mm and a length of about 250 mm. After not heating (25° C.), heating at 100° C. for 2 minutes or heating at 140° C. for 2 minutes, those test pieces were placed on a polished stainless test plate and adhered thereto by pressing down with a 2 kg rubber roller reciprocally. After 30 minutes, 180° peeling adhesive force to the test plate was obtained at a tensile speed of 300 mm/min. It was measured in accordance with adhesive force of JIS Z 0237.

(2) Holding Power of Adhesive Sheet:

It was measured in accordance with holding power of JIS Z 0237. Namely, the same adhesive sheet as in the case of the adhesion test was prepared and cut into pieces having a width of 25 mm in width and a length of about 150 mm to obtain test pieces. After (i) not conducting heat treatment (25° C.), (ii) heating at 100° C. for 2 minutes or (iii) heating at 140° C. for 2 minutes, those test pieces were adhered to a stainless test plate such that each test piece came in contact with the plate in an area of 25 mm×25 mm, and then pressed thereto by pressing down with a 2 kg rubber roller reciprocally. After 30 minutes, a 1 kg load was applied thereon at 40° C. and the time until peeling off was measured. When a test piece was held for 3 hours, the slippage distance was measured. When a test piece peeled off immediately after loading, the holding time was referred to as "0 minute".

(3) Probe Tack of Adhesive Sheet:

Measurement was performed in accordance with the probe tack test as defined in JIS Z 0237. Namely, the same adhesive sheet as in the case of the adhesive force test was prepared and cut into pieces having a width of about 20 mm and a length about 20 mm to obtain test pieces. After subjecting those test pieces to the same treatments as in (i) to (iii) described in the above (2), the measurement was carried out under the test conditions of columnar probe=5 mm diameter; contact speed and peeling speed=0.2 cm/sec; and contact load=0.98±0.01 N/cm.

(4) Water Resistance of Adhesive Sheet:

The same adhesive sheet as in the case of the adhesive strength test was prepared and immersed in water at 20° C. for 1 hour. Whitened state of the pieces was visually observed and evaluated as follows: Not whitened: O; and Whitened: x.

SYNTHESIS EXAMPLE 1

Preparation of Aqueous Emulsion (A1)

(1) A monomer mixture was prepared by mixing 90 parts of 2-ethylhexyl acrylate, 8 parts of methyl methacrylate, 1 part of 2-hydroxyethyl methacrylate and 1 part of methacrylic acid.

(2) 100 parts of deionized water and 0.5 part of sodium lauryl sulfate were supplied into a flask provided with a stirrer, a thermometer, a condenser and a nitrogen inlet tube. After heating to 60° C. in a nitrogen atmosphere, 5 parts of an aqueous solution of t-butyl hydroperoxide and 10 parts of a 10% aqueous solution of Rongalite (formaldehyde sodium sulfoxylate dihydrate) were added thereto. Further, 100 parts of the monomer mixture prepared in the above (1) was added dropwise thereto over 3 hours. After completion of the addition, the resulting mixture was reacted for additional 2 hours at the same temperature to thereby complete the polymerization, thus obtaining an aqueous emulsion (A) (solid content: 50%) containing an alkyl (meth)acrylate-based polymer (this emulsion is hereafter referred to as "Aqueous Emulsion (A1)").

SYNTHESIS EXAMPLE 2

Preparation of Aqueous Emulsion (A2)

(1) A monomer mixture was prepared by mixing 24 parts of butyl acrylate, 70 parts of 2-ethylhexyl acrylate, 4.9 parts of acrylonitrile, 1 part of acrylic acid and 0.1 part of N-methylolacrylamide.

(2) To the monomer mixture prepared in the above (1) were added 1 part of sodium polyoxyethylene nonylphenyl ether sulfate and 40 parts of deionized water. The resulting mixture was emulsified with a three-one mortar to prepare an aqueous emulsified dispersion.

(3) 60 parts of deionized water and 0.2 part of sodium carbonate (a neutralizing agent) were fed into the same type of a flask as used in Synthesis Example 1 (2). Under stirring in a nitrogen atmosphere while maintaining the inner temperature at 70° C., 10 parts of an aqueous solution of ammonium persulfate (ammonium persulfate/deionized water=0.3 part/0.7 part) and 200 parts of the aqueous emulsified dispersion prepared in the above (2) were added dropwise thereto over 3 hours. After completion of the addition, the resulting mixture was reacted for additional 2 hours at the same temperature to thereby complete the polymerization, thus obtaining an aqueous emulsion (A) (solid content: 50%) containing an alkyl (meth)acrylate-based polymer (this emulsion is hereinafter referred to as "Aqueous Emulsion (A2)".

SYNTHESIS EXAMPLE 3

Preparation of Aqueous Emulsion (A3)

Emulsion polymerization was conducted in the same manner as in Synthesis Example 2 except for using a monomer mixture of 95 parts of isononyl acrylate, 4 parts of methyl methacrylate, 0.8 parts of methacrylic acid and 0.2 parts of N-methylolacrylamide, and using 1 part of sodium lauryl sulfate as an emulsifier, thus obtaining an aqueous emulsion (A) (solid content: 50%) containing an alkyl (meth)acrylate-based polymer (this emulsion is hereinafter referred to as "Aqueous Emulsion (A3)".

SYNTHESIS EXAMPLE 4

Preparation of Aqueous Emulsion (A4)

Emulsion polymerization was conducted in the same manner as in Synthesis Example 1 except for using a monomer mixture of 95 parts of butyl acrylate, 4 parts of acrylonitrile and 1 part of acrylic acid, thus otaining an aqueous emulsion (A) (solid content: 50%) containing an alkyl (meth)acrylate-based polymer (this emulsion is hereinafter referred to as "Aqueous Emulsion (A4)".

SYNTHESIS EXAMPLE 5

Preparation of Aqueous Emulsion (A5)

Emulsion polymerization was conducted in the same manner as in Synthesis Example 1 except for using a monomer mixture of 98 parts of 2-ethylhexyl acrylate, 1 part of methacrylic acid and 1 part of 2-hydroxyethyl methacrylate, thus obtaining an aqueous emulsion (A) (solid content: 50%) containing an alkyl (meth)acrylate-based polymer (this emulsion is hereinafter referred to as "Aqueous Emulsion (A5)".

The contents of the respective aqueous emulsions (A) obtained in the above Synthesis Examples 1 to 5 [solid content of the aqueous emulsion A, and monomer composition and Tg of alkyl (meth)acrylate-based polymer contained in the aqueous emulsion (A)] are shown in the following Table 2.

In the following Tables 2 and 3, monomers are expressed in abbreviation. The abbreviation and its content are as shown in Table 1 below.

TABLE 1

| Abbreviation | Kind of Monomer |
|---|---|
| BMA | Butyl methacrylate |
| MMA | Methyl methacrylate |
| AN | Acrylonitrile |
| HEMA | 2-Hydroxyethyl methacrylate |
| MAA | Methacrylic acid |
| ST | Styrene |
| AA | Acrylic acid |
| AEH | 2-Ethylhexyl acrylate |
| BA | Butyl acrylate |
| EA | Ethyl acrylate |
| INA | Isononyl acrylate |
| NMAM | N-Methylolacrylamide |

TABLE 2

[Contents of aqueous emulsion (A)]

| | | Solid content (%) | Alkyl(methacrylate)-based polymer | |
|---|---|---|---|---|
| | Symbol | | Monomer composition (weight ratio) | $Tg^{1)}$ (°C.) |
| Synthesis Example 1 | A1 | 50 | AEH/MMA/HEMA/MAA = 90/8/1/1 | −60.2 |
| Synthesis Example 2 | A2 | 50 | BA/AEH/AN/AA/NMAM = 24/70/4.9/1/0.1 | −60.2 |
| Synthesis Example 3 | A3 | 50 | INA/MMA/MAA/NMAM = 95/4/1/0.2 | −77.1 |
| Synthesis Example 4 | A4 | 50 | BA/AN/AA = 95/4/1 | −51.2 |
| Synthesis Example 5 | A5 | 50 | AEH/HEMA/MAA = 90/1/1 | −68.2 |

$^{1)}$Caculated.

SYNTHESIS EXAMPLE 6

Preparation of Aqueous Solution of Copolymer (B1)

(1) 0.5 Part of 2,2'-azobisisobutyronitrile was dissolved in a liquid mixture of 20 parts of butyl methacrylate, 10 parts of methyl methacrylate, 35 parts of acrylonitrile, 10 parts of 2-hydroxyethyl methacrylate, 25 parts of methacrylic acid and 100 parts of methyl ethyl ketone, and the resulting solution was supplied into a flask equipped with a stirrer, a condenser, a thermometer and a nitrogen inlet tube. After heating at 80° C. in a nitrogen atmosphere for 4 hours, 0.5 part of additional 2,2'-azobisisobutyronitrile was added thereto. The resulting mixture was heated at the same temperature for 5 hours, thereby obtaining a methyl ethyl ketone solution of a copolymer before neutralization (solid content: 50%, acid value: 162.5 mgKOH/g copolymer).

(2) To 201 parts of the methyl ethyl ketone solution of the copolymer before neutralization obtained above was gradually added 100 parts of 3.9% aqueous ammonia under stirring to thereby neutralize the carboxyl groups in the copolymer before neutralization. After pH of the reaction mixture became about 7 to 8, the methyl ethyl ketone was removed at a temperature of 50° C. under reduced pressure, thereby obtaining an aqueous solution (pH 7.7) of the copolymer (B) (solid content: 54%) (this copolymer is hereinafter referred to as "aqueous solution of the copolymer (B1)".

SYNTHESIS EXAMPLES 7 to 12

Copolymers (B2) and (B3) and copolymers (b1) to (b4) were synthesized in the same manner as in Synthesis Example 6 except for using the monomers as shown in Table 3 below.

TABLE 3

Properties of aqueous copolymer solution

| | | Copolymer before neutralization | | Copolymer after neutralization | |
|---|---|---|---|---|---|
| | | | | Base for neutralization | |
| Synthesis Example | Symbol | Monomer composition (weight ratio) | Tg (°C.) | Kind | Boiling point (°C.) |
| 6 | B1 | BMA/MMA/AN/HEMA/MAA = 20/10/35/10/25 | 88.6 | $NH_3$ | −34.4 |
| 7 | B2 | MMA/ST/AA = 85/5/10 | 104.9 | $NH_3$ | −34.4 |
| 8 | B3 | BMA/MMA/AA = 20/50/30 | 84.5 | $NH_3$ | −34.4 |
| 9 | b1 | AEH/HEM/MAA = 75/10/15 | −43.6 | $NH_3$ | −34.4 |
| 10 | b2 | BMA/MAA/AN/HEMA/MAA = 20/10/35/10/25 | 88.6 | $TEA^{1)}$ | 360.0 |
| 11 | b3 | BMA/BA/MAA = 10/65/25 | −18.9 | $NH_3$ | −34.4 |
| 12 | b4 | INA/HEMA/AA = 75/10/15 | −56.9 | $TEA^{1)}$ | 360.0 |

$^{1)}$TEA: Triethanol amine.

EXAMPLE 1

(1) 80 parts of the aqueous emulsion (A1) obtained in Synthesis Example 1 and 20 parts of the aqueous solution of the copolymer (B1) obtained in Synthesis Example 6 were supplied into a beaker and stirred at room temperature (25° C.) for 15 minutes to obtain a liquid adhesive composition.

(2) The adhesive composition obtained in the above (1) was applied onto a polyester film having a thickness of 50 μm with a bar coater such that a dry adhesive layer thickness was 20 to 30 μm, and then dried at 70° C. for 5 minutes to obtain an adhesive sheet.

(3) The results of the measurement of the adhesive force, holding power, probe tack and water resistance of the adhesive sheet obtained in the above (2) are shown in Table 4 below. Examples 2 to 4 and Comparative Examples 1 to 5

Each aqueous emulsion (A) and aqueous copolymer solution shown in Table 4 were mixed in the proportion as shown in Table 4, and an adhesive composition was prepared in the same manner as in Example 1 (1). Using the adhesive composition obtained above, an adhesive sheet was produced in the same manner as in Example 1 (2). Adhesive force, holding power, probe tack and water resistance of the sheet were measured. The results are shown in Table 4 below.

TABLE 4

| Example | Composition of adhesive layer (weight ratio) | Adhesive force (g/25 mm) Before heating (25° C.) | Adhesive force (g/25 mm) After heating 100° C. 2 min | Adhesive force (g/25 mm) After heating 140° C. 2 min | Holding power Before heating (25°) | Holding power After heating 100° C. 2 min | Holding power After heating 140° C. 2 min |
|---|---|---|---|---|---|---|---|
| Example 1 | A1/B1 = 80/20 | 3 or less | 100 | 1100 | 0 min | 0.0 mm | 0.0 mm |
| Example 2 | A2/B2 = 80/20 | 3 or less | 3 or less | 850 | 0 min | 0 min | 0.0 mm |
| Example 3 | A3/B3 = 80/20 | 3 or less | 15 | 1200 | 0 min | 0.0 mm | 0.0 mm |
| Example 4 | A4/B1 = 80/20 | 3 or less | 150 | 1050 | 0 min | 0.0 mm | 0.0 mm |
| Comparative Example 1 | A5/b1 = 80/20 | 1150 | 1150 | 1140 | 10 min | 60 min | 60 min |
| Comparative Example 2 | A1/b2 = 80/20 | 3 or less | 110 | 1120 | 0 min | 0.0 mm | 0.0 mm |
| Comparative Example 3 | A1/b3 = 80/20 | 910 | 930 | 920 | 10 min | 40 min | 45 min |
| Comparative Example 4 | A1/b4 = 80/20 | 950 | 970 | 970 | 15 min | 20 min | 25 min |
| Comparative Example 5 | A1[2] | 900 | 900 | 910 | 0.2 mm | 0.2 mm | 0.2 mm |

1) Kinds and mixing ratio of the aqueous emulsion (A) and the aqueous solution of the copolymer (B) or (b) in each adhesive composition.

2) Aqueous emulsion (A1) alone (containing sodium dodecylbenzene sulfonate).

It is seen from the data shown in Table 4 above that the adhesive sheets of the Examples 1 to 4, which had each an adhesive layer composed of an aqueous emulsion (A) containing an alkyl (meth)acrylate-based polymer (a) having a glass transition temperature of −10° C. or below obtained by emulsion-polymerizing radically polymerizable monomers containing as the main component an alkyl (meth)acrylate in an aqueous medium, and a copolymer (B) having a glass transition temperature of 20° C. or above obtained by copolymerizing an α,β-ethylenically unsaturated carboxylic acid with other radically polymerizable monomers, wherein a part or the entire amount of the carboxyl groups in the copolymer had been neutralized with a base having a boiling point of 110° C. or below, have an adhesive force at a temperature of 25° C. determined by the 180° peeling test method as specified in JIS Z 0237 of 10 g/25 mm or less, and do not show adhesive properties at ordinary temperature but, when heated, exhibit good adhesive properties, which enable the adhesive sheets to effectively use as heat-sensitive adhesive sheets.

In contrast to this, the adhesive sheets of Comparative Examples 1, 3 and 4, that is, adhesive sheets having an adhesive layer composed of an aqueous emulsion (A) and an aqueous copolymer having Tg lower than 20° C., already have high adhesive properties even at ordinary temperature and thus do not have heat-sensitive characteristics.

Further, it is seen from the data of Comparative Examples 2 and 4 that if the aqueous copolymers obtained by neutralizing the carboxyl groups with a base having a boiling point exceeding 110° C. are used, water resistance of the adhesive sheets becomes poor.

The data of Comparative Example 5 indicate that in the adhesive tape having an adhesive layer made of the aqueous emulsion (A) alone, the adhesive layer shows adhesive properties even at ordinary temperature and the adhesive properties do not basically change before and after heating.

EXAMPLE 5

(1) A monomer mixture was prepared by mixing 95 parts of 2-ethylhexyl acrylate and 5 parts of 2-hydroxyethyl methacrylate.

(2) 100 parts of deionized water and 30 parts of the aqueous solution of the copolymer (B1) prepared in Synthesis Example 6 were added to a flask equipped with a stirrer, a thermometer, a condenser and a nitrogen inlet tube. After rising temperature to 60° C. in a nitrogen atmosphere, 5 parts of an aqueous solution of t-butyl hydroperoxide, 5 parts of a 10% aqueous solution of RONGALITE (trade name: formaldehyde sodium sulfoxylate dihydrate) and 100 parts of the monomer mixture prepared in the above (1) were added dropwise over 3 hours. After completion of the dropwise addition, reaction was continued for additional 2 hours at the same temperature to complete the polymerization, thereby obtaining an aqueous polymer emulsion having a solid content concentration of 49%. The contents of the aqueous polymer emulsion obtained are shown in Table 5 below.

(3) The aqueous polymer emulsion obtained in the above (2) was applied onto a polyester film having a thickness of 50 μm with a bar coater at a dry adhesive layer thickness of 20 to 30 μm and then dried at 70° C. for 5 minutes to prepare an adhesive sheet.

(4) The results of the measurement of the adhesive force, holding power, probe tack and water resistance of the adhesive sheet obtained in the above (3) are shown in Table 6 below.

EXAMPLE 6

A monomer mixture was prepared by mixing 25 parts of butyl acrylate, 70 parts of 2-ethylhexyl acrylate, 4.9 parts of acrylonitrile and 0.1 part of N-methylolacrylamide.

The monomer mixture prepared above was mixed with 30 parts of the aqueous solution of the copolymer (B2) prepared in Synthesis Example 7 and 40 parts of deionized water. The resulting mixture was emulsified with a three-one mortar to prepare an aqueous emulsified dispersion.

Polymerization was conducted in the same manner as in Example 5 using the aqueous emulsified dispersion obtained above to prepare an aqueous polymer emulsion with a solid content concentration of about 49%. The contents of the aqueous polymer emulsion obtained are shown in Table 5. An adhesive sheet was produced using the aqueous polymer emulsion obtained, and the adhesive force, holding power, probe tack and water resistance thereof were measured by the above-mentioned methods. The results are shown in Table 6.

EXAMPLE 7

A monomer mixture was prepared by mixing 35 parts of ethyl acrylate, 60 parts of butyl acrylate, 4.7 parts of methyl methacrylate and 0.3 parts of N-methylolacrylamide.

Emulsion polymerization was conducted in the same manner as in Example 5 except for using, in the production of the aqueous polymer emulsion, 20 parts of the aqueous solution of the copolymer (B3) prepared in Synthesis Example 8 and 100 parts of the monomer mixture as described above, to prepare an aqueous polymer emulsion as shown in Table 4. The adhesive force, holding power, probe tack and water resistance were measured for an adhesive sheet produced by using the above aqueous polymer emulsion. The results are shown in Table 6.

EXAMPLE 8

A monomer mixture was prepared by mixing 95 parts of butyl acrylate, 4 parts of acrylonitrile and 1 part of acrylic acid.

Emulsion polymerization was conducted in the same manner as in Example 5 except for using, in the production of the aqueous polymer emulsion, 30 parts of the aqueous solution of the above-mentioned copolymer (B1) and 100 parts of the monomer mixture as described above to prepare an aqueous polymer emulsion as shown in Table 4. The adhesive force, holding power, probe tack and water resistance were measured for an adhesive sheet produced by using the aqueous polymer emulsion as described above. The results are shown in Table 6.

COMPARATIVE EXAMPLES 6 to 9

Aqueous polymer emulsions were prepared in the same manner as in Example 5 except for using 100 parts of monomer mixtures as shown in Table 5 as the radically polymerizable monomer mixture containing an alkyl (meth) acrylate-based polymer as the main component and 30 parts of the copolymer aqueous solutions as shown in Table 5.

Adhesive sheets were produced using the aqueous polymer emulsions obtained and physical properties thereof were evaluated. The results are shown in Table 6.

TABLE 5

Contents of aqueous polymer emulsion

| Example. | Aqueous copolymer solution | Aqueous polymer emulsion Composition of radically polymerizable monomers[1] (wt. ratio) | Tg(° C.)[2] (calcd.) |
|---|---|---|---|
| Example 5 | B1 | AEH/HEMA = 95/5 | −66.1 |
| Example 6 | B2 | BA/AEH/AN/NMAM = 25/70/4.9/0.1 | −61.6 |
| Example 7 | B3 | EA/BA/MMA/NMAM = 35/60/4.7/0.3 | −40.6 |
| Example 8 | B1 | BA/AN/AA = 95/4/1 | −51.2 |
| Comparative Example 6 | b1 | AEH/HEMA = 95/5 | −66.1 |
| Comparative Example 7 | b2 | AEH/HEMA = 95/5 | −66.1 |
| Comparative Example 8 | b3 | AEH/HEMA = 95/5 | −66.1 |
| Comparative Example 9 | b4 | AEH/HEMA = 95/5 | −66.1 |

[1]Composition of radically polymerizable monomers containing alkyl (meth)acrylate as the main component.
[2]Tg (calculated) of alkyl (meth)acrylate-based polymer.

TABLE 6

Physical properties of adhesive sheet

| | Adhesive force (g/25 mm) | | | Holding power | | |
|---|---|---|---|---|---|---|
| | Before | After heating | | Before | After heating | |
| Example | heating (25° C.) | 100° C. 2 min | 140° C. 2 min | heating (25°) | 100° C. 2 min | 140° C. 2 min |
| Example 5 | 3 or less | 100 | 1200 | 0 min | 0.0 mm | 0.0 mm |
| Example 6 | 3 or less | 3 or less | 830 | 0 min | 0 min | 0.2 mm |
| Example 7 | 3 or less | 10 | 500 | 0 min | 0.0 mm | 0.0 mm |
| Example 8 | 3 or less | 150 | 1250 | 0 min | 0.0 mm | 0.0 mm |
| Comparative Example 6 | 1100 | 1100 | 1140 | 50 min | 60 min | 60 min |
| Comparative Example 7 | 3 or less | 110 | 1120 | 0 min | 0.2 mm | 0.3 mm |
| Comparative Example 8 | 1000 | 1000 | 1000 | 30 min | 40 min | 40 min |
| Comparative Example 9 | 900 | 920 | 920 | 20 min | 20 min | 20 min |

Physical properties of adhesive sheet

| | Probe tack | | | Water resistance | | |
|---|---|---|---|---|---|---|
| | Before | After heating | | Before | After heating | |
| Example | heating (25° C.) | 100° C. 2 min | 140° C. 2 min | heating (25°) | 100° C. 2 min | 140° C. 2 min |
| Example 5 | 5 or less | 55 | 950 | ○ | ○ | ○ |
| Example 6 | 5 or less | 5 or less | 700 | ○ | ○ | ○ |
| Example 7 | 5 or less | 28 | 450 | ○ | ○ | ○ |
| Example 8 | 5 or less | 70 | 80 | ○ | ○ | ○ |
| Comparative Example 6 | 900 | 900 | 920 | ○ | ○ | ○ |
| Comparative Example 7 | 5 or less | 60 | 940 | X | X | X |
| Comparative Example 8 | 815 | 850 | 880 | ○ | ○ | ○ |
| Comparative Example 9 | 780 | 880 | 810 | X | X | X |

Industrial Applicability

The heat-sensitive adhesive sheets of the present invention do not show adhesive properties or do not substantially show adhesive properties, at ordinary temperature. Therefore, it is not necessary to subject an adhesive layer to a release treatment, such as use of a release paper or coating a release agent on a substrate surface, and the sheets can be stored, distributed and sold with or without packaging. As a result, the sheets are excellent in the points of resource saving, simplification of production process and cost reduction.

The heat-sensitive adhesive sheets of the present invention can exhibit various adhesion performances of from high adhesiveness to moderate adhesiveness, or in some cases, to slightly low adhesiveness, by heating and/or applying pressure. Therefore, the sheets can be used in wide uses such as labels, tapes, seals for packages, wallpapers, markers, and others.

In particular, where it is used as a wallpaper, use method becomes possible that the wallpaper is adhered and fixed by conducting positioning utilizing low adhesiveness and then applying heat.

Further, even if the heat-sensitive sheet of the present invention is adhered to an adherend by exhibiting adhesiveness by heating and/or applying pressure and temperature returns to ordinary temperature, the adhesive properties once exhibited are maintained, so that the heat-sensitive adhesive sheet adhered does not peel from the adherend.

Where the heat-sensitive adhesive sheet of the present invention adhered to the adherend is desired to peel from the adherend, it can be easily peeled off therefrom by merely pulling with fingers. The adhesive layer thus peeled can again be adhered to the same adherend or another adherend, if necessary.

Further, the heat-sensitive adhesive sheet of the present invention can freely set the heating temperature for exhibiting adhesive properties, and the adhesive layer does not become hard even after the passage of time. Therefore, there is no fear that the adherend peels off when the adhesive sheet is bent. In addition, trouble does not occur that the components of the adhesive layer ooze out onto the substrate.

What is claimed is:

1. A heat-sensitive adhesive sheet, characterized in that it is a heat-sensitive adhesive sheet having on a substrate an adhesive layer comprising a polymer composition emulsion (C) obtained by emulsion polymerizing a radically polymerizable monomer comprising as a main component, an alkyl (meth)acrylate forming an alkyl (meth)acrylate-based polymer (a) having a glass transition temperature of $-10°$ C. or less, in an aqueous medium in the presence of a water-soluble or water-dispersible copolymer (B) having a glass transition temperature of $20°$ C. or more, which is a copolymer having an acid value of 30–260 mgKOH/g obtained by copolymerizing an $\alpha,\beta$-ethylenically unsaturated carboxylic acid with other radically polymerizable monomers, wherein a part or the entire amount of carboxyl groups in the copolymer is neutralized with a base having a boiling point of $110°$ C. or less; and that an adhesive force determined by the $180°$ peeling test method as specified in JIS Z 0237 at a temperature of $25°$ C. is 10 g/25 mm or less, and wherein the amount of carboxyl groups neutralized in the copolymer (B) is at least 30 mol % of the carboxyl groups.

2. The heat-sensitive adhesive sheet as claimed in claim 1, wherein the amount of the alkyl (meth)acrylate in said radical-polymerizable monomers used for obtaining said alkyl (meth)acrylate type polymer (a) is 60 to 100% by weight based on the total amount of the radically polymerizable monomers.

3. The heat-sensitive adhesive sheet as claimed in claim 1, wherein the alkyl group in said alkyl (meth)acrylate in said alkyl (meth)acrylate-based polymer (a) has 1 to 9 carbon atoms.

4. The heat-sensitive adhesive sheet as claimed in claim 1, wherein the alkyl (meth)acrylate-based polymer (a) in said alkyl (meth)acryalte-based polymer (a) has a glass transition temperature of $-30°$ C. or below.

5. The heat-sensitive adhesive sheet as claimed in claim 1, wherein the $\alpha,\beta$-ethylenically unsaturated carboxylic acid in said copolymer (B) is selected from the group consisting of acrylic acid, methacrylic acid, crotonic acid, maleic acid, fumaric acid, itaconic acid, citraconic acid and maleic anhydride.

6. The heat-sensitive adhesive sheet as claimed in claim 1, wherein the radically polymerizable monomer to be copolymerized with the $\alpha,\beta$-ethylenically unsaturated carboxylic acid in said copolymer (B) is selected from the group consisting of (meth)acrylates, aromatic vinyl compounds, (meth)acrylonitrile, vinyl acetate, vinyl propionate, N-methylol (meth)acrylamide, vinyl chloride, vinyl fluoride, vinylidene chloride, vinylidene fluoride, ethylene and trichloroethylene.

7. The heat-sensitive adhesive sheet as claimed in claim 1, wherein said copolymer (B) has a glass transition temperature of from 30 to $200°$ C.

8. The heat-sensitive adhesive sheet as claimed in claim 1, wherein the ratio of said copolymer (B) (solid content) to said alkyl (meth)acrylate-based polymer (a) (solid content) is copolymer (B)/alkyl (meth)acrylate-based polymer (a)= 5/95 to 80/20 by weight ratio.

* * * * *